US010482108B2

(12) United States Patent
Parees et al.

(10) Patent No.: US 10,482,108 B2
(45) Date of Patent: Nov. 19, 2019

(54) CONTAINER CLUSTERING IN A CONTAINER-BASED ARCHITECTURE

(71) Applicant: Red Hat, Inc., Raleigh, NC (US)

(72) Inventors: Benjamin Michael Parees, Durham, NC (US); Martin Nagy, Brno (CZ); Michal Fojtik, Brno (CZ); Rodolfo Henrique Carvalho, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 373 days.

(21) Appl. No.: 15/054,746

(22) Filed: Feb. 26, 2016

(65) Prior Publication Data
US 2017/0249374 A1    Aug. 31, 2017

(51) Int. Cl.
*G06F 16/28*    (2019.01)
*H04L 29/12*    (2006.01)

(52) U.S. Cl.
CPC ........ *G06F 16/285* (2019.01); *H04L 61/1511* (2013.01)

(58) Field of Classification Search
CPC ............. G06F 17/30598; G06F 11/301; G06F 2009/4557; G06F 9/44505; G06F 9/5077; G06F 16/285; G06F 11/3006; H04L 61/1511; H04L 41/0893; H04L 41/12; H04L 41/5041; H04L 65/105; H04L 65/1073; H04L 67/02; H04L 67/16; H04L 67/10
USPC .................... 707/999.004; 709/226; 712/208
See application file for complete search history.

(56) References Cited

U.S. PATENT DOCUMENTS

| | | | |
|---|---|---|---|
| 5,953,681 A * | 9/1999 | Cantatore | G01N 15/14 702/31 |
| 6,502,103 B1 | 12/2002 | Frey et al. | |
| 6,966,010 B1 | 11/2005 | Curtis et al. | |
| 7,254,634 B1 * | 8/2007 | Davis | G06F 11/203 709/227 |
| 7,340,739 B2 | 3/2008 | Alam | |
| 8,489,811 B1 | 7/2013 | Corbett et al. | |
| 9,231,988 B2 | 1/2016 | Holt et al. | |
| 9,720,709 B1 * | 8/2017 | Stickle | G06F 9/5077 |
| 2002/0174117 A1 * | 11/2002 | Nykanen | G06Q 10/06 |

(Continued)

OTHER PUBLICATIONS

"Configuring a Cluster Automatically with the DB2 High Availability (HA) Feature", https://www-01.ibm.com/support/knowledgecenter/SSEPGG_9.7.0/com.ibm.db2.luw.admin.ha.doc/doc/t0051380.html.

(Continued)

*Primary Examiner* — Dennis Truong
(74) *Attorney, Agent, or Firm* — Womble Bond Dickinson (US) LLP; Daniel E. Ovanezian

(57) ABSTRACT

Implementations provide for container clustering in a container-based architecture. A method of the disclosure includes generating by a processing device executing a container deploying an instance of an application image, a domain name server (DNS) query to request identification of other containers in a container cluster. The other containers deploy other instances of the application image. The method also includes in responsive to the DNS query, receiving the identification of each of the other containers in the container cluster. The method further includes configuring, without manual intervention, the container as a member of the container cluster in view of the identification of each of the other containers.

18 Claims, 5 Drawing Sheets

(56) References Cited

U.S. PATENT DOCUMENTS

| | | | |
|---|---|---|---|
| 2006/0107218 A1* | 5/2006 | Clark | G06F 3/0481 715/733 |
| 2006/0200533 A1* | 9/2006 | Holenstein | G06F 16/273 709/208 |
| 2007/0260723 A1* | 11/2007 | Cohen | G06F 9/5027 709/223 |
| 2010/0131630 A1* | 5/2010 | Kondamuru | G06F 9/5083 709/222 |
| 2011/0313973 A1 | 12/2011 | Srivas et al. | |
| 2014/0298091 A1* | 10/2014 | Carlen | H04L 65/80 714/15 |
| 2015/0082005 A1* | 3/2015 | Glasner | G06F 9/30156 712/208 |
| 2015/0281111 A1* | 10/2015 | Carl | H04L 47/70 709/226 |
| 2016/0205518 A1* | 7/2016 | Patel | H04L 67/1002 455/518 |
| 2017/0373940 A1* | 12/2017 | Shahab | H04L 41/12 |

OTHER PUBLICATIONS

"How to Scale Docker Containers in Production", http://stackoverflow.com/questions/18285212/how-to-scale-docker-containers-in-production.

"Discovering, Promoting, and Adding Targets", https://docs.oracle.com/cd/E24628_01/doc.121/e24473/discovery.htm#EMADM13119.

Usman Ismail, "Creating a Magento Cluster on AWS using Docker and Rancher", http://rancher.com/creating-a-magento-cluster-docker-and-rancher-on-aws/, Mar. 2, 2015.

"MySQL Replication Example"; https://github.com/openshift/mysql/tree/master/5.6/examples/replica, 3 pages.

"PostgreSQL Replication Example", https://github.com/openshift/postgresql/tree/master/examples/replica, 4 pages.

"MongoDB Replica Set Example", https://github.com/openshift/mongodb/tree/master/2.4/examples/replica, 2 pages.

"How to Deploy Galera Cluster for MySQL using Docket Containers"; http://severalnines.com/blog/how-deploy-galera-cluster-mysql-using-docker-containers, 11 pages.

* cited by examiner

CONTAINER CLUSTERING IN A CONTAINER-BASED ARCHITECTURE

TECHNICAL FIELD

The implementations of the disclosure relate generally to container-based architectures and, more specifically, relate to container clustering in a container-based architecture.

BACKGROUND

An "application container" or "container" may refer to an interface between a host and a functional application. The functional application may comprise related processes and may provide a certain service (e.g., an HTTP server, a database server, etc.). The host may be represented by a host computer system or by a virtual machine being executed by a host computer system. In the containerized execution model, the application and its dependencies (such as binaries and/or libraries that as necessary to run the application) run within the application container, which is an isolated process in the user space of the host operating system, sharing the kernel with other containers.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
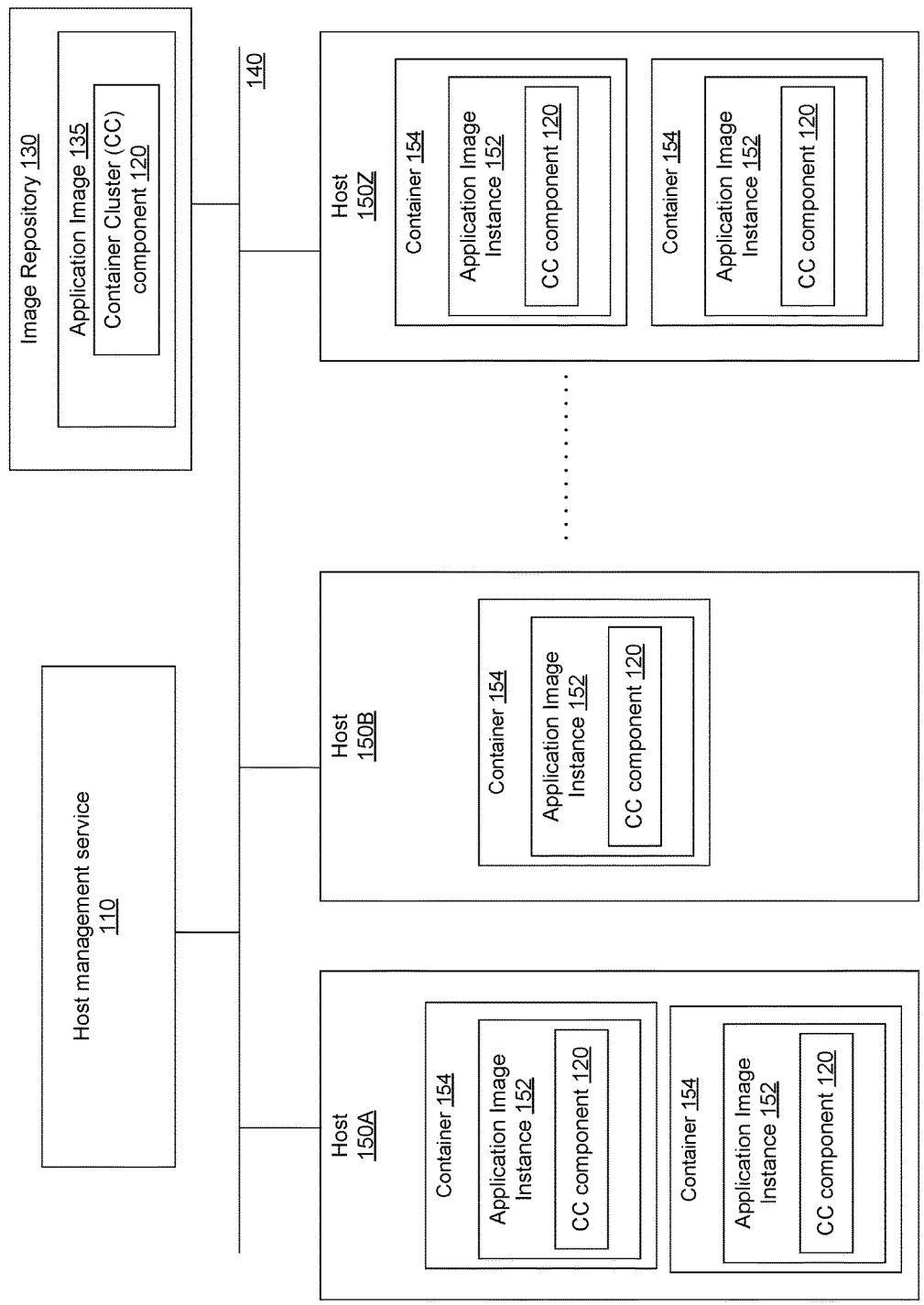
FIG. 1 is a block diagram that shows an example of a distributed computer system in which implementations of the disclosure may operate.

Implementations of the disclosure provide for container clustering in a container-based architecture. Implementations provide a container cluster component that is implemented as a part of a host computer system of the container-based architecture. The container-based architecture implements a containerized execution model, in which an application and its dependencies (such as binaries and/or libraries used to run the application) execute within at least one application container (also referred to herein as a "container"). The application container is an isolated process in user space of a host operating system, sharing the kernel with other containers. The container-based architecture of implementations of the disclosure may host more than one application container for the application. The application containers corresponding to an application may be associated together as a container cluster by the container-based architecture. Container clusters refer to the grouping of containers into sets and the management of each set of containers.

In one implementation, the container cluster component provides a tool to discover, configure, monitor, and re-configure the containers in a container cluster implemented in the container-based architecture with minimal to no manual intervention. The container cluster component can be part of a master application image ("application image") maintained in an image repository of the container-based architecture. The image repository stores ready-to-run application images (e.g., master application image) for containers of the container-based architecture. An image refers to data representing executables and files of an application used to deploy functionality for a runtime instance of the application. In one implementation, an instance of the master application image may be deployed to a container executed on a host machine of the container-based architecture. Once deployed, the application image instance causes functionality of the container cluster component (e.g., discover, configure, monitor, and re-configure the containers in the container cluster to which the container belongs) to be executed in the container with minimal to no manual intervention.

Previous container clustering solutions provide for manual performance of discovery, configure and reconfiguring of the cluster containers by a user, such as an administrator of the host system. Such a manual process of container clustering can be time consuming, complex and very expensive. Implementations of the disclosure address the above-noted and other deficiencies by providing methods and systems for performing container clustering with minimal to no manual intervention. For example, implementations of the disclosure provide for container clustering by employing a container cluster component, which executes a container deploying an instance of an application image to generate a domain name server (DNS) query to request identification of other containers in the container cluster. In response to the DNS query, the cluster container component receives an identity of each of the other containers. Further, the cluster container component configures, without manual intervention, the container as a member of the container cluster based on the identity of each of the other containers.

FIG. 1 is a block diagram that shows an example of distributed computer system 100 operating in accordance with implementations of the disclosure. Distributed computer system 100 may include a host management service 110, an image repository 130 and a plurality of host computer systems (hosts) 150A-150Z. Each of the host management service 110, the image repository 130 and the plurality of host computer systems (hosts) 150A-150Z may communicate with each other via one or more networks 140. Network 140 may be a private network (e.g., a local area network (LAN), a wide area network (WAN), intranet, or other similar private networks) or a public network (e.g., the Internet).

The plurality of host computer system (hosts) 150A-150Z executes applications or other processes running on one or more hosts 150A-150Z. In some implementations, these hosts are virtual machines (VMs) that are hosted on a physical machine, such as one or more hosts 150A-150Z. When the hosts' 150A-150Z are implemented as VMs, they may be executed by one or more operating systems (OSs) on the hosts 150A-150Z. An example computer system 150A may run multiple VMs, by executing a functionality layer, often referred to as a "virtual machine monitor" or "hypervisor," above the hardware and below the virtual machines.

The hypervisor may abstract the physical layer, including processors, memory, and I/O devices, and present this abstraction to virtual machines as virtual devices. A virtual machine may execute a guest operating system, which may utilize underlying virtual processors, virtual memory, and virtual I/O devices. Under the guest operating system, one or more applications may be running on the virtual machine.

In some implementations, the host machines 150A-150Z are often located in a data center. In other implementations, the applications may be hosted directly on hosts 150A-150Z without the use of VMs (e.g., a "bare metal" implementation), and in such an implementation, the hosts themselves are referred to as "nodes". Hosts 150A-150Z may be grouped into clusters. A cluster includes two or more hosts sharing certain attributes describing the processor type, networking configuration, and/or storage configuration of the host.

In one implementation, each of the hosts 150A-150Z are in communication with host management service 110, which receives commands from an external system. For example, an external system is a multi-tenant platform-as-a service (PaaS) system. Utilizing commands received from the external system, the host management service 110 provides data (e.ge. such as pre-generated images) associated with different applications to one or more hosts 150A-150Z. In some implementations, the data may be stored in the image repository 122 or in an image repository (not shown) located on each of the hosts 150A-150Z. This data may be used for the execution of applications for the external system (not shown).

In one implementation, the data used for execution of applications includes application images built from preexisting application components and source code of users managing the application. As discussed above, an image refers to data representing executables and files of the application used to deploy functionality for a runtime instance of the application. An application may include, for example, a web server application or files for an online bulletin board service. In various illustrative examples, host management service 110 may be implemented by host management platforms such as oVirt®, RHEVM®, VMWARE®, Foreman®, and/or other platforms providing similar functionality.

One or more applications may be provisioned and executed on each one of the hosts 150A-150Z respectively. In one implementation, each of the hosts 150A-150Z may run multiple applications that may be owned or managed by different users and/or organizations. As such, a first user's deployed application may co-exist with any other user's deployed application on the same host 150A-150Z that is hosting the first user's deployed application. In some implementations, portions of an application execute on multiple different hosts 150A-150Z.

Each of the hosts 150A-150Z may run an application by launching an application image instance 152 of an application image 135 using a container 154 on the hosts 150A-150Z. An application image includes the underlying support processes that implement the functionality of one of the applications.

In one implementation, an application image 135 for an application may be built by an image build system (not shown) by combining a preexisting ready-to-run application image corresponding to core functional components of the application (e.g., a web framework, database, etc.) with source code specific to the application provided by the user. For example, the preexisting ready-to-run application images may include support software providing functionality (e.g., configuration templates, scripts, dependencies, etc.) used to run the applications and/or add a feature to the applications. For example, the images may support languages such as, but not limited to, Java™, PHP, Ruby, Python, Perl, and so on. In addition, application images may be generated that support databases, such as MySQL™ PostgreSQL™, Mongo™, and others. Preexisting ready-to-run application images may also include those that support the build and continuous integration environments, such as a Jenkins-based image. Lastly, preexisting ready-to-run application images may be used to support management capabilities and/or tools, such as PHPmyadmin, RockMongo™, 10gen-mms-agent, HAProxy, Maven, and Gradle, for example.

As discussed above, each built application image 135 may map to a functional component of an application. As such, an application may have more than one application image 135 associated with the application. One example of this is a JavaEE™ application that uses a JBoss™ application server-based application image with a supporting MySQL™ database provided by a MySQL™-based application image. Built application images 135 may be pushed to an image repository 130 for storage and accessibility for subsequent use in launching instances 152 of the application image 135 for execution at the containers 154 in the hosts 150A-150Z.

Each of the containers 154 is a resource-constrained process space on each of the hosts 150A-150Z to execute functionality of an application. In some implementations, each of the containers 154 is established by its respective host 150A-150Z with resource boundaries, including a limit and/or designation of the amount of memory, amount of storage, and security types and/or labels to be applied to any functions executed by the respective container 154. In one implementation, the containers 154 may be established using Linux Containers (LXC) or Docker® containers. In further implementations, the containers 154 may also be established using more primitive features, such as cgroups, SELinux™, and kernel namespaces, to name a few examples.

As shown in FIG. 1, application image instances 152 for an application may be launched in containers 154 dispersed over more than one host 150A-150Z. When more than one application image instance 152 of an application image 135 is launched in multiple containers 154 for the application, the multiple containers 154 may be grouped together in a container cluster. Each container 154 in a container cluster should be configured to be a member of the cluster to enable interoperability and communication within the container cluster.

In one implementation, a container cluster component 120 is provided to implement discovery, provisioning, configuration, re-configuration, monitoring, and/or other management functions for containers 154 in a container cluster. Each built application image, such as application image 135 stored in image repository 130, includes the container cluster component 120. When the application image 135 is deployed to one or more running containers 154 of a container cluster, the application instance 152 causes functionality of the container cluster component 120 to execute in the respective container 154 on the respective host 150A-150Z. For example, the container cluster component 120 may include one or more processes to perform container discovery, provisioning, configuration, re-configuration, monitoring, and/or other management functions with respect to a container cluster of the containers 154 in the hosts 150A-150Z.

In one implementation, when the application image instance 152 is deployed in a newly-launched container 154, the container cluster component 120 of that application image instance 152 causes a domain name server (DNS) query to be sent to host management service 110 to request identification of other containers 154 in which other application image instances (instances) 152 of the application image 135 are deployed (i.e., other containers in the container cluster). In one implementation, each of the containers 154 register their identifications (i.e. internet protocol address) with a DNS entry in a DNS server (not shown) based on their corresponding container cluster. Thus, as each container 154 that belongs to its corresponding container cluster is deployed with an application image instance 152 of the application image, a common DNS entry is updated with each new container's identification. This update in the DNS entry enables each container 154 to query the DNS entry to identify a set of containers 154 in the container cluster that are related to each other.

In one implementation, the DNS query is generated and sent by the container cluster component 120 with minimal or no interaction from a user. In one implementation, the DNS query is made using a tool such as "dig" to discover the Internet Protocol (IP) addresses of all other containers 154 associated with the application image 135. In response to the DNS query, the container cluster component 120 receives the identification (e.g., IP addresses) of all other containers 154 in the container cluster (i.e., all other containers 154 deploying instances 152 of the application image 135). As a result, identities (e.g., IP addresses) of other containers 154 of a container cluster to which a newly-deployed application image instance 152 belongs is provided to the launching container 154 without manual intervention by a user.

In one implementation, the container cluster component 120 utilizes the received identities of the other respective containers 154 in the container cluster to communicate with the other container cluster components 120 of the other containers 154 in the container cluster. In one implementation, the container cluster component 120 communicates with the other container cluster components 120 in the container cluster to configure the newly launched container 154.

In one implementation, the configuration of a newly launched container 154 includes assigning a cluster hierarchy topology (e.g., master/slave, slave/slave, etc.) to the container 154. For example, the container cluster component 120 may assign one of the containers 154 in the container cluster as a master container and other of the containers in the container cluster as slave containers. In one example, the container 154 in the host 150A is assigned as a master container and the rest of the containers 154 in the hosts 150B-150Z are assigned as slave containers such that data in the slave containers 154 of the hosts 150A are synchronized with the data in the master container 154 of the host 150A. In another example, the configuration includes assigning a slave/slave topology to the containers 154 in a container cluster. The container cluster components 120 in the hosts 150A-150Z assigns the containers 154 in the hosts 150A-150Z as the slave hosts such that the data in each one of the containers 154 are synchronized with each of the other containers 154 in the container cluster. Such data may include, but is not limited to, passwords, encryption key(s), etc. As such, each of the containers 154 in the container cluster are configured without manual intervention.

In one implementation, the container cluster components 120 in each of the containers 154 of the container cluster monitor their respective containers 154. For example, the container cluster component 120 of a container 154 may detect a change in state at the container 154. The change in state may include removal of a container 154 from a container cluster. The change in state may include addition of a container 154 a container cluster. The change in state may include change in number of containers 154 in the container cluster.

In one implementation, upon detection of the change in state at a container 154, the corresponding container cluster component 120 of the container 154 reconfigures or updates the configuration of the container 154. For example, the updating of the configuration of the container 154 may include updating files on the file system to update the list of containers in the container cluster. In another example, the updating of the configuration of the container 154 may include changing the dynamic state of running process to inform the process of the new/update list of containers in the container cluster. In one implementation, removal of a container in the container cluster includes that the container has stopped executing. The rest of the containers in the cluster detect that the container has stopped executing. These containers may detect which container has stopped executing via scanning a set of DNS entries or via a live transmission control protocol (tcp) connection to the container, which is removed from the container cluster when it stops executing. In one implementation, the rest of the containers in the container cluster update their configuration with a new/updated current list of the containers.

Subsequent to a configuration update, the container cluster component 120 may communicate with the other container cluster components 120 of the other containers regarding the change of state of the container 154.

In one implementation, the container cluster components 120 of the each of the other containers 154 in the container cluster reconfigures or updates the configuration of their respective containers 154 upon receipt of a change of state communication from another container cluster component 120 in the container cluster. For example, a container cluster component 120 of the host 150A may detect a change in state of the container 154 in the host 150A. The container cluster component 120 of the host 150A reconfigures or updates the configuration of the container 154 in the host 150A and communicates with the container cluster components 120 of the other containers 154 in hosts 150A-150Z of the change in state. The other container cluster components 120 then reconfigures or updates the configuration of their respective containers 154. As such, each of the containers 154 in the container cluster are re-configured and/or updated without manually re-configuring each of the containers 154 separately.

Figure 2:
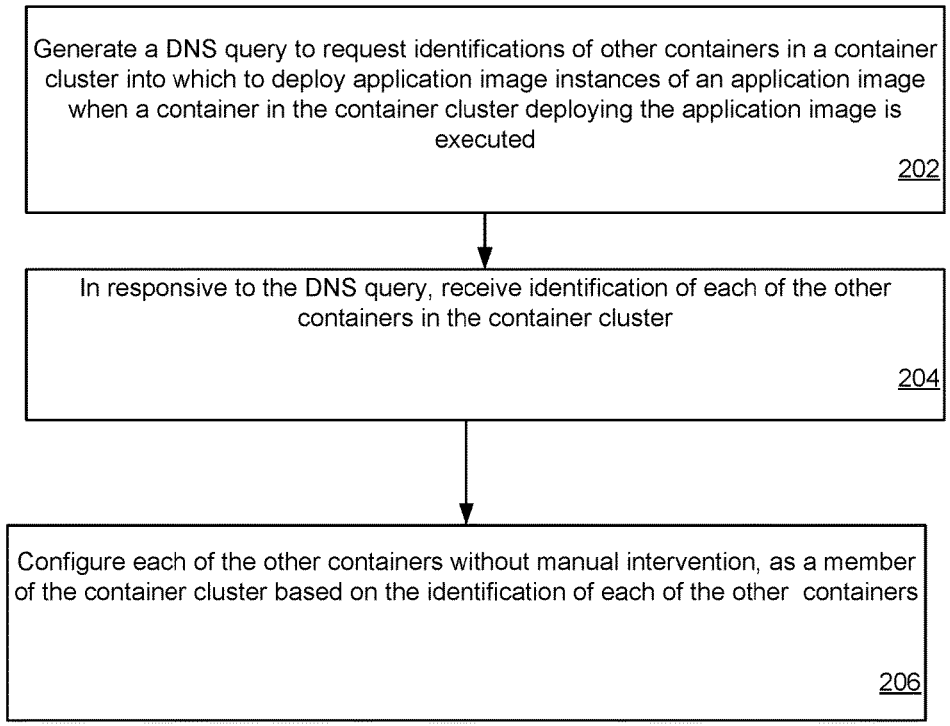
FIG. 2 is flow chart that shows an example of a process for discovering and configuring of containers employed in container-based applications in accordance with an implementation of the disclosure.

FIG. 2 is a flow diagram illustrating a method 200 for a process of discovering and configuring containers of a container cluster in a container-based architecture in accordance with an implementation of the disclosure. Method 200 may be performed by processing logic that may comprise hardware (e.g., circuitry, dedicated logic, programmable logic, microcode, etc.), instructions run on a processing device or a combination thereof. In one implementation, method 200 is performed by container cluster component 120 of FIG. 1.

Method 200 begins at block 202 where a DNS query is generated to request identifications of other containers in a container cluster into which to deploy application image instances of an application image when a container in the container cluster deploying the application image instance is executed. As discussed above, the DNS query is generated by a container cluster component when the application image is deployed as part of the application image instance. As discussed above, an image refers to data representing executables and files of the application used to deploy functionality for a runtime instance of the application. An application may include, for example, a web server application or files for an online bulletin board service. At block 204, in responsive to the DNS query, the identification of each of the other containers in the container cluster is received. As such, identification of each of the other containers in the container cluster is discovered without manual intervention by a user. The identification of the other containers may include IP addresses of the containers.

At block 206, each of the other containers in the plurality of hosts are configured, without manual intervention, as a member of the container cluster based on the identification of each of the other containers. In one implementation, configuration includes assigning a cluster hierarchy topology to the container in the container cluster. The cluster hierarchy topology may be a master/slave topology such that one of the containers in the container cluster is assigned a master container and the rest of the containers in the container cluster are assigned as slave containers. The cluster hierarchy topology may be a slave/slave topology such that each of the containers in the container cluster are assigned as slaves. As such, each of the containers in the cluster are configured without manually configuring each of the containers in separately.

Figure 3:
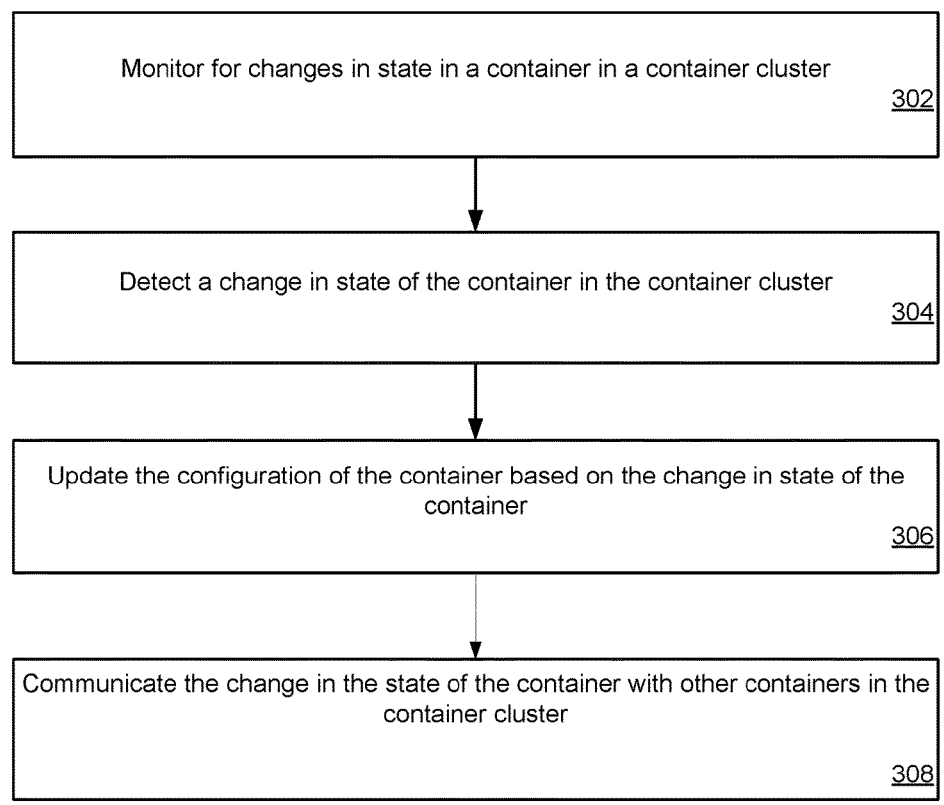
FIG. 3 is flow chart that shows an example of a process for monitoring and re-configuring of a container employed in container-based applications in accordance with an implementation of the disclosure.

FIG. 3 is a flow diagram illustrating a method 300 for a process of monitoring and re-configuring containers of a container cluster in a container-based architecture in accordance with an implementation of the disclosure. Method 300 may be performed by processing logic that may comprise hardware (e.g., circuitry, dedicated logic, programmable logic, microcode, etc.), instructions run on a processing device or a combination thereof. In one implementation, method 300 is performed by container cluster components 120 of FIG. 1.

Method begins at block 302 where a container in a container cluster is monitored for changes in state. At block 304, a change in state of the container is detected. The change in state may include removal of a container in the container cluster. The change in state may include an addition of a container in the container cluster. At block 306, a configuration of the container in the container cluster is updated base on the change in state of the container. As such, the container is re-configured or updated without manually intervention of the user. Subsequently, at block 308, the change in the state of the container is communicated to other containers in the container cluster.

Figure 4:
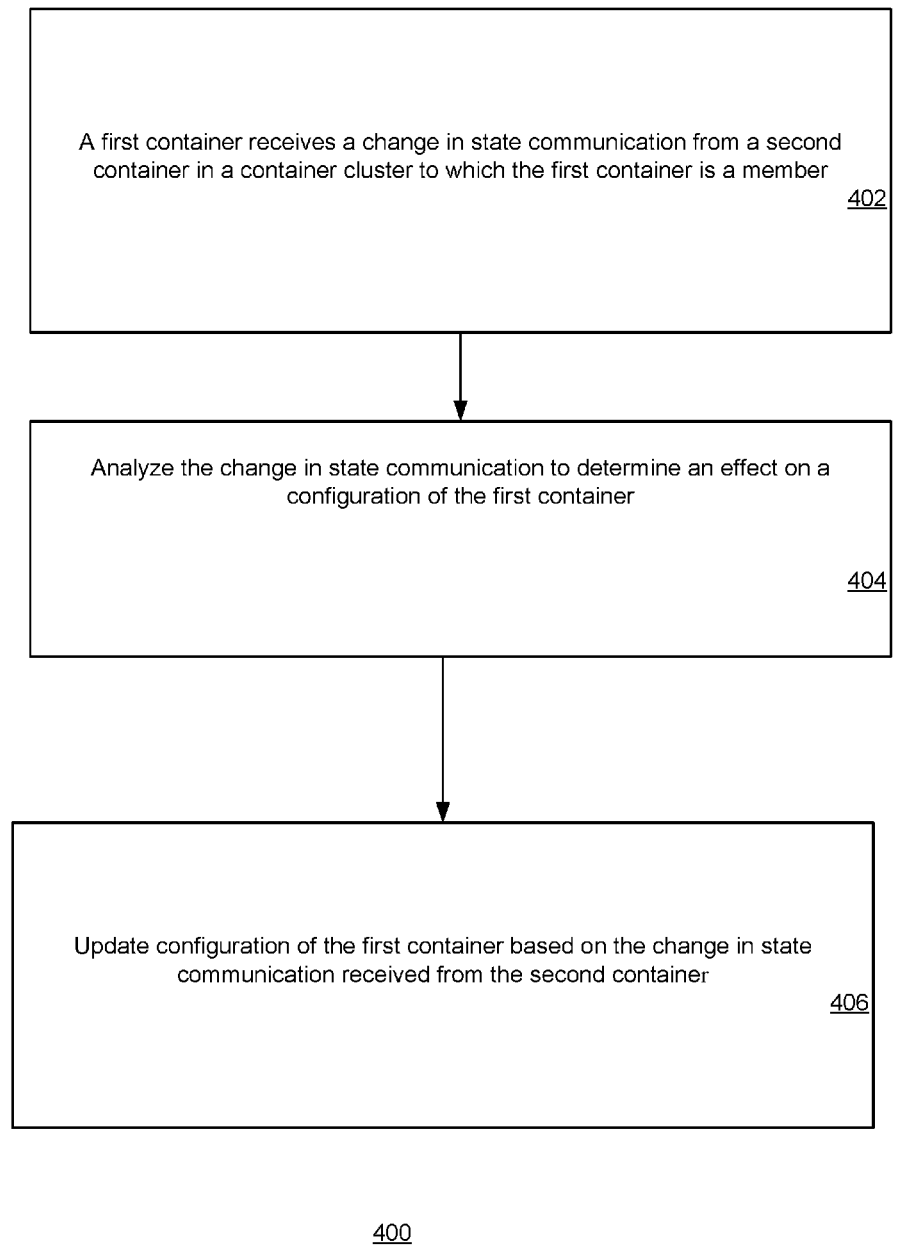
FIG. 4 flow chart that shows an example of another process for monitoring and re-configuring of a container employed in container-based applications in accordance with an implementation of the disclosure.

FIG. 4 is a flow diagram illustrating a method 400 for a process of monitoring and re-configuring containers of a container cluster in a container-based architecture in accordance with an implementation of the disclosure. Method 400 may be performed by processing logic that may comprise hardware (e.g., circuitry, dedicated logic, programmable logic, microcode, etc.), instructions run on a processing device or a combination thereof. In one implementation, method 400 is performed by container cluster components 120 of FIG. 1.

Method begins at block 402 where a first container receives a change in state communication from a second container in a container cluster to which the first container is a member. At block 404, the change in state communication is analyzed to determine an effect on a configuration of the first container. Subsequently, at block 406, the configuration of the first container is updated based on the change in state communication received from the second container.

Figure 5:
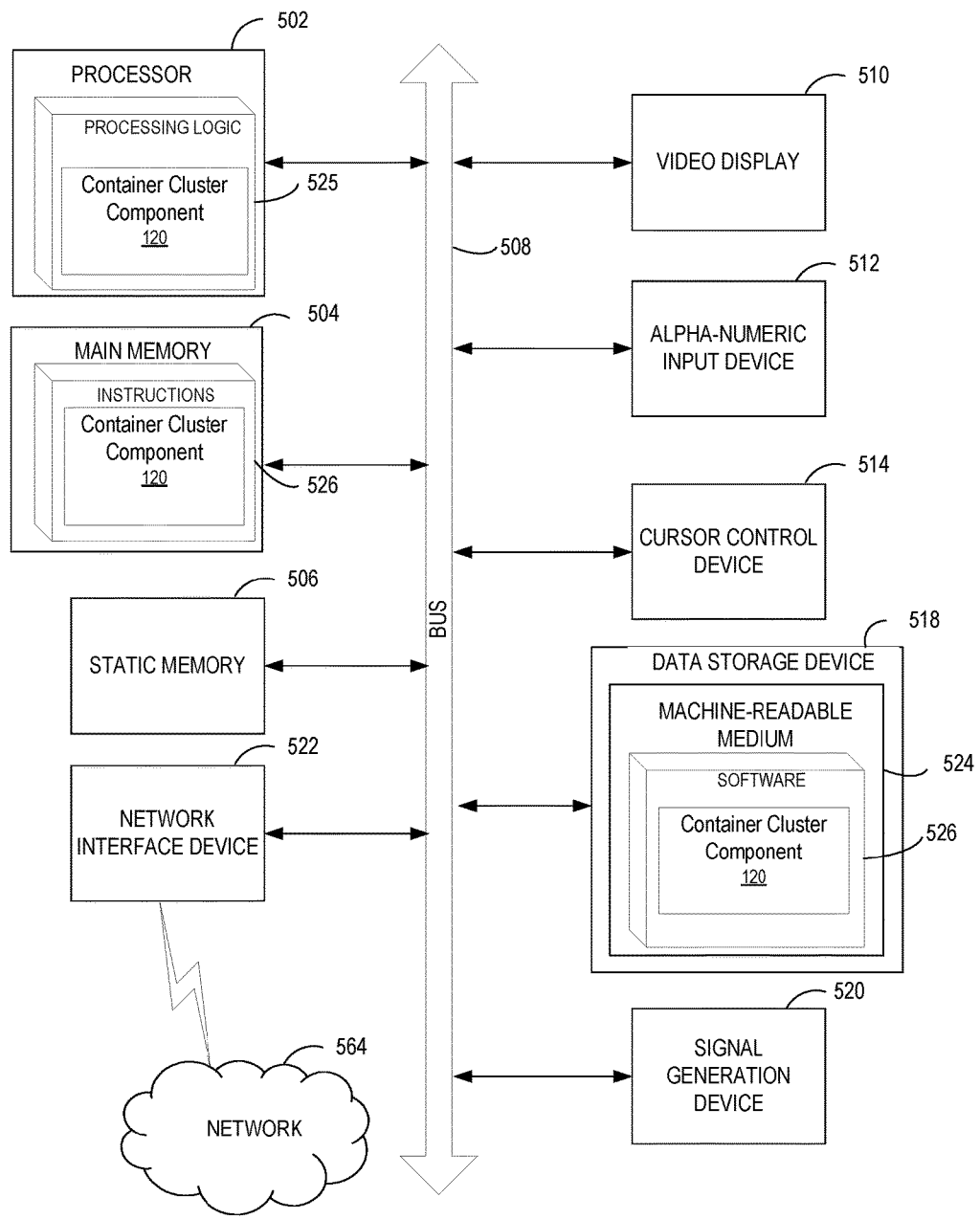
FIG. 5 is a schematic diagram that shows an example of one implementation of a computing system.

FIG. 5 illustrates a diagrammatic representation of a machine in the example form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is to execute the processing logic 526 for performing the operations and steps discussed herein.

The computer system 500 may further include a network interface device 508 communicably coupled to a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 to implement container cluster component 120 described with respect to FIG. 1, and/or a software library containing methods that call the above applications. While the machine-accessible storage medium 528 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, structures and devices are shown in block diagram form, rather than in detail, in order to avoid obscuring the disclosure.\

Some portions of the detailed descriptions, which follow are presented in terms of processes and symbolic representations of operations on data bits within a computer memory. These process descriptions and representations are the means used in the data processing arts. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "determining", "generating", "implementing", "providing", "configuring", "updating", "communicating", "monitoring", "detecting" "assigning", "deploying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The processes and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite those features regarded as the disclosure.

What is claimed is:

1. A method, comprising:

receiving, from an image repository, an application image comprising a container cluster component embedded in the application image, wherein the container cluster component causes a processing device executing a container deploying an instance of the application image to generate a domain name server (DNS) query;

upon deploying the instance of the application image, generating, by the processing device, the DNS query to request identification of other containers in a container cluster, the other containers deploying other instances of the application image, wherein when the application image is deployed to the container, the instance causes functionality of the container cluster to execute the container on a respective host;

responsive to the DNS query, receiving, by the processing device, the identification of each of the other containers in the container cluster; and configuring, by the processing device without manual intervention, the container as a member of the container cluster in view of the identification of each of the other containers, wherein configuring the container comprises:

assigning a cluster hierarchy topology to the container in the container cluster, wherein the cluster hierarchy topology comprise one of a master/slave or a slave/slave topology and wherein the container is assigned either as a master container or a slave container by a container cluster component within the cluster.

2. The method of claim 1 further comprising monitoring the container for changes in a state of the container.

3. The method of claim 2 further comprising detecting a change in the state of the container in view of the monitoring, wherein the change in state comprises one of addition or deletion of the container.

4. The method of claim 3 further comprising updating the configuration of the container in view of the detected change in state.

5. The method of claim 3 further comprising communicating the change in state in the container with the other containers in the container cluster.

6. The method of claim 2 further comprising receiving a change in state communication from one of the other containers, wherein the change in state comprises one of addition or deletion of the one of the other containers in the container cluster.

7. The method of claim 6 further comprising updating the configuration of the container in view of the received change in state communication.

8. A system, comprising:
a memory;
a processing device communicably coupled to the memory, the processing device to:
receive, from an image repository, an application image comprising a container cluster component embedded in the application image, wherein the container cluster component causes a respective processing device executing a container deploying an instance of the application image to generate a domain name server (DNS) query;
deploy the instance of the application image in a container;
receive the DNS query to request identification of other containers in a container cluster, the other containers deploying other instances of the application image comprising the container cluster component embedded in the application image, wherein when the application image is deployed in the container, the instance causes functionality of the container cluster to execute the container on a respective host;
responsive, to the DNS query, discover the identification of each of the other containers in the container cluster; and
configure, without manual intervention, the container as a member of the container cluster in view of the identification of each of the other containers, wherein to configure the container comprises:
assign a cluster hierarchy topology to the container in the container cluster, wherein the cluster hierarchy topology comprise one of a master/slave or a slave/slave topology and wherein the container is assigned either as a master container or a slave container by a container cluster component within the cluster.

9. The system of claim 8 wherein the processing device to detect a change in state in of the container, wherein the change in state comprises one of addition or deletion of the container.

10. The system of claim 9 wherein the processing device to update the configuration of the container in view of the detected change.

11. The system claim 9 wherein the processing device to communicate the change in state in the container with the other containers in the container cluster.

12. The system claim 9 wherein the processing device to update the configuration of the container in view of the detected change in state communication.

13. The system claim 8 wherein the processing device to receive a change in state communication from one of the other containers, wherein the change in state comprises one of addition or deletion of the one of the other containers in the container cluster.

14. A non-transitory machine-readable storage medium including instructions that, when accessed by a processing device, cause the processing device to:
receive, from an image repository, an application image comprising a container cluster component embedded in the application image, wherein the container cluster component causes a respective processing device executing a container deploying an instance of the application image to generate a domain name server (DNS) query;
execute the container deploying the instance of the application image;
detect the DNS query requesting identification of other containers in a container cluster, the other containers deploying other instances of the application image comprising the container cluster component embedded in the application image, wherein when the application image is deployed in the container, the instance causes functionality of the container cluster to execute the container on a respective host;
responsive, to the DNS query, determine the identification of each of the other containers in the container cluster; and
configure, without manual intervention, the container as a member of the container cluster in view of the identification of each of the other containers, wherein to configure the container comprises:
assign a cluster hierarchy topology to the container in the container cluster, wherein the cluster hierarchy topology comprise one of a master/slave or a slave/slave topology and wherein the container is assigned either as a master container or a slave container by a container cluster component within the cluster.

15. The non-transitory machine-readable storage medium of claim 14 wherein the processing device to detect a change in state of the container, wherein the change in state comprises one of addition or deletion of the container.

16. The non-transitory machine-readable storage medium of claim 15 wherein the processing device is to update the configuration of the container in view of the detected change in state in the container.

17. The non-transitory machine-readable storage medium of claim 15 wherein the processing device is to communicate the change in state in the container with other containers in the container cluster.

18. The non-transitory machine-readable storage medium of claim 17 wherein the processing device is to update the configuration of the container in view of the communicated change in state communication.

* * * * *